United States Patent [19]

Kawata et al.

[11] 4,339,109

[45] Jul. 13, 1982

[54] ELECTROMAGNETICALLY OPERATED VALVE UNIT

[75] Inventors: Shoji Kawata, Okazaki; Kazutaka Kuwana, Toyota, both of Japan

[73] Assignee: Aisin Seiki Kabushiki Kaisha, Kariya, Japan

[21] Appl. No.: 136,826

[22] Filed: Apr. 3, 1980

[30] Foreign Application Priority Data

Apr. 4, 1979 [JP] Japan ............................ 54-44097[U]
Apr. 6, 1979 [JP] Japan ............................ 54-46209[U]

[51] Int. Cl.³ .................... F16K 31/06; H01F 7/08
[52] U.S. Cl. .................................. 251/129; 251/141; 335/261; 335/258
[58] Field of Search ................. 251/141, 139, 129; 335/261, 262, 258

[56] References Cited

U.S. PATENT DOCUMENTS

| | | | |
|---|---|---|---|
| 2,853,659 | 9/1958 | Herion | 251/141 X |
| 3,285,285 | 11/1966 | Bielefeld | 251/139 X |
| 3,588,039 | 6/1971 | Chelminski et al. | 251/141 |
| 4,193,421 | 3/1980 | Sakakibara et al. | 251/129 |
| 4,216,938 | 8/1980 | Inada et al. | 251/139 X |
| 4,240,468 | 12/1980 | Brand et al. | 251/141 X |

Primary Examiner—Arnold Rosenthal
Attorney, Agent, or Firm—Oblon, Fisher, Spivak, McClelland & Maier

[57] ABSTRACT

An electromagnetically operated valve unit includes a casing of magnetic material having inlet and outlet ports, a support shaft of non-magnetic material fixed in position within the casing and provided at its one end with an axial bore coaxial with the outlet port and an axial hole formed in the peripheral wall of the bore to provide fluid communication between the inlet and outlet ports, a plunger of magnetic material in the form of a sleeve member axially slidable on the support shaft and cooperating with the axial hole to open and close the fluid communication, a coil spring for biasing the plunger in one direction to normally close the axial hole, a tubular yoke of magnetic material surrounding the support shaft and facing at its inner circumference to the outer circumference of the plunger with a predetermined annular clearance, and a solenoid coil wound around the tubular yoke.

2 Claims, 4 Drawing Figures

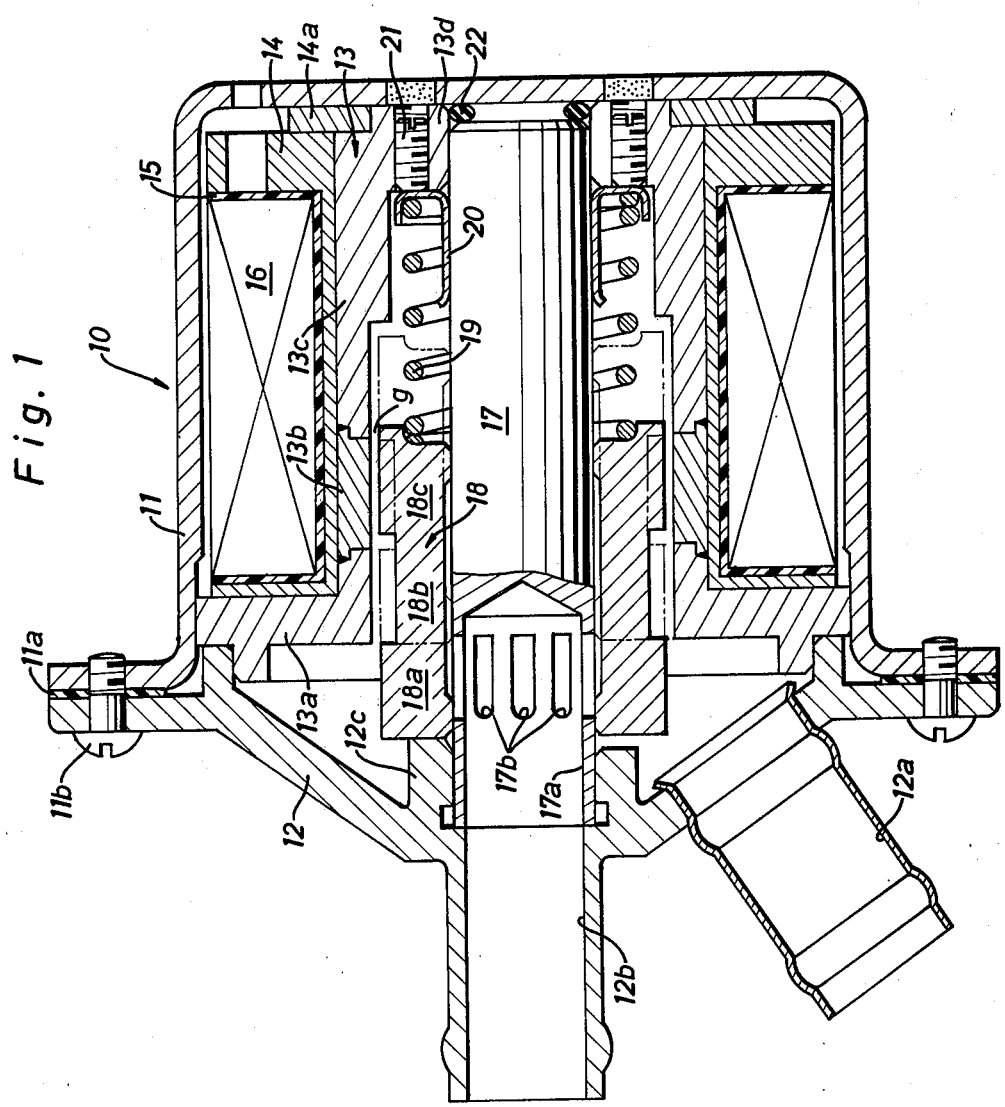

4,339,109

ELECTROMAGNETICALLY OPERATED VALVE UNIT

BACKGROUND OF THE INVENTION

The present invention relates to electromagnetically operated valve units, and more particularly to an improvement of an electromagnetically operated valve unit which includes a solenoid coil wound around a tubular yoke of magnetic material, a plunger of magnetic material axially movable within the tubular yoke and facing at its outer circumference the inner circumference of the yoke with a predetermined annular clearance to provide a magnetic circuit across the yoke and plunger, a valve assembly cooperating with the plunger to control the quantity of fluid flow passing therethrough, and resilient means for biasing the plunger in one direction to normally close the valve assembly.

In such a conventional valve unit as described above, when the solenoid coil is energized by an electric current from an electric power source, a linear attraction force is generated in proportion to the value of the electric current between the inner circumference of the yoke and the outer circumference of the plunger. Thus, the plunger is displaced by the linear attraction force against the biasing force of the resilient means to control the opening degree of the valve assembly. In operation of the valve unit, the length of the moving-stroke of the plunger is limited by the magnetic saturation characteristic of the plunger. For this reason, when the amount of magnetic flux across the yoke and plunger reaches the value of magnetic saturation due to increase of the outer circumference area of the plunger facing the inner circumference of the yoke upon by displacement of the plunger, the linear attraction force does not increase, and the displacement of the plunger is restricted by the biasing force of the resilient means before arrival of the plunger at the end of its maximum stroke. On the other hand, it is required to keep the axial length of the valve unit as short as possible in a simple construction and to permit smooth displacement of the plunger so as to ensure a good performance of the valve unit.

SUMMARY OF THE INVENTION

It is, therefore, a primary object of the present invention to provide an improved valve unit capable of keeping the axial length of the valve unit as short as possible in a simple construction and permitting smooth displacement of the plunger.

Another object of the present invention is to provide an improved valve unit wherein the plunger is smoothly displaced to the end of its maximum stroke without any influence of magnetic saturation.

According to an aspect of the present invention, there is provided an electromagnetically operated valve unit which comprises a casing of magnetic material having inlet and outlet ports, a support shaft of non-magnetic material fixed in position within the casing and having an axial bore coaxial with one of the ports and an axial hole formed in the peripheral wall of the axial bore to provide fluid communication between the inlet and outlet ports, a plunger of magnetic material in the form of a sleeve member axially movable on the support shaft and cooperating with the axial hole of the support shaft to open and close the fluid communication, resilient means for biasing the plunger in one direction to normally close the axial hole of the support shaft, a tubular yoke assembly concentrically surrounding the support shaft and facing at its inner circumference the outer circumference of the plunger with a predetermined annular clearance, and a solenoid coil wound around the tubular yoke to be energized by an electric current from an electric power source.

The tubular yoke assembly includes a pair of tubular members of magnetic material and an annular member of non-magnetic material which are concentrically arranged with the support shaft and face at their inner circumferences the outer circumference of the plunger with a predetermined annular clearance. The plunger includes a pair of large diameter portions and a small diameter portion between the large diameter portions, the axial length of each of the large diameter portions being substantially equal to the axial length of each of the tubular yoke members. The large diameter portions of the plunger face the inner circumference of the yoke assembly with the predetermined annular clearance and are formed respectively at their outer circumferences with a plurality of grooves in such a manner that the outer circumference area of each of the large diameter portions is substantially equal to the cross-section area of the samll diameter portion.

BRIEF DESCRIPTION OF THE DRAWING

Additional objects and advantages of the present invention will be more readily apparent from the following detailed description of a preferred embodiment thereof when taken together with the accompanying drawing in which:

FIG. 1 is a sectional view of an electromagnetically operated valve unit in accordance with the present invention;

FIG. 2 illustrates the front face of a plunger shown in FIG. 1;

DESCRIPTION OF THE PREFERRED EMBODIMENT

Figure 3:
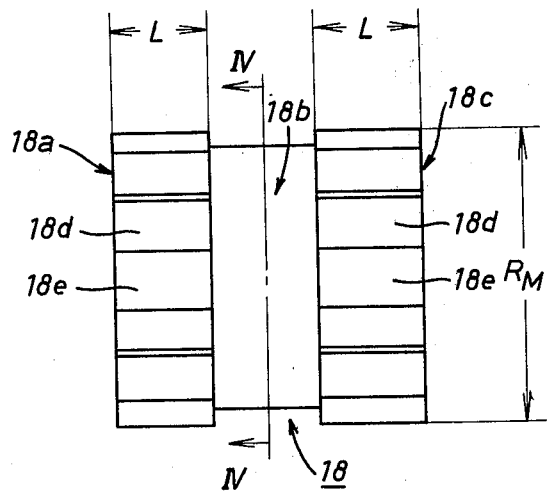
FIG. 3 is a side view of the plunger shown in FIG. 1.

Referring now to the drawing, there is illustrated an electromagnetically operated valve unit 10 according to the present invention which is actuated by a linear motor to control the quantity of fluid flow in proportion to an input electric current applied thereto. The valve unit 10 has a casing 11 of magnetic material which is closed by a cover member 12 of non-magnetic material. The cover member 12 is fastened by screws 11b at its outer rim to an annular flange of casing 11 through an annular gasket 11a. The cover member 12 is provided with an inlet port 12a for connection to a pneumatic pressure source (not shown) and an outlet port 12b for connection to a pneumatically operated device (not shown).

The casing 11 contains therein a tubular yoke assembly 13, a frame member 14 of non-magnetic material surrounding the tubular yoke, and a solenoid coil 16 wound around the frame member through a bobbin 15 of non-magnetic material. As shown in FIG. 1, the tubular yoke assembly 13 consists of an annular flange 13a of magnetic material, an annular member 13b of non-magnetic material, and a stepped tubular member 13c of magnetic material, which are unitedly secured as the tubular yoke. The frame member 14 is coupled over the tubular yoke 13 and assembled in place by means of a collar member 14a. Thus, the annular flange 13a and tubular member 13c of yoke 13 associate with the casing 11 and a sleeve-like plunger 18 to provide a magnetic circuit.

Within a hollow portion of yoke 13, there is provided a support shaft 17 of non-magnetic material one end of which is fixed in position by engagement within a boss 12c of cover member 12 and the other end of which is fixed in position by engagement within a stepped portion 13d of yoke 13. The support shaft 17 is concentrically arranged with the yoke 13 and supports the plunger 18 thereon slidably in the axial direction. The support shaft 17 is provided in its left-hand portion with an axial bore 17a coaxial with the outlet port 12b, and the peripheral wall of bore 17a is provided with equidistantly spaced axial holes 17b which cooperate with the plunger 18 to open and close fluid communication between the inlet and outlet ports 12a and 12b. In addition, the support shaft 17 is received by an annular seal member 22 at its right end.

The sleeve-like plunger 18 is in engagement with the inner end of boss 12c by biasing force of a compression coil spring 19 to normally close the axial holes 17b of support shaft 17. The coil spring 19 is engaged at its one end with the stepped portion 13d of yoke 13 through an annular retainer 20 and at its other end with the right-hand end of plunger 18. Screws 21 are threaded into the stepped portion 13d of yoke 13 to adjust the biasing force of coil spring 19. The plunger 18 includes a pair of large diameter portions 18a and 18c formed in the same dimension and a small diameter portion 18b formed between the large diameter portions. In this arrangement, there is allowed a predetermined annular clearance g between the outer circumference of each of the large diameter portions 18a and 18c and the inner circumference of a large diameter bore of yoke 13. It is also noted that the axial length of the large diameter portion 18a is substantially equal to the axial length of the inner circumference of the annular flange 13a, and that the axial length of the large diameter portion 18c is substantially equal to the axial length of a large diameter bore of the stepped tubular member 31c.

As shown in FIG. 2, the large diameter portions 18a and 18c of plunger 18 are respectively formed at their outer circumferences with a plurality of equidistantly spaced axial grooves 18d each width of which is in a predetermined dimension. Thus, the outer circumference areas 18e of each of large diameter portions 18a and 18c are substantially equal to a cross-sectional area of the small diameter portion 18b. The cross-sectional area of small diameter portion 18b is also substantially equal to the minimum cross-sectional area of magnetic path of the magnetic circuit. Furthermore, each axial groove 18d of plunger 18 is formed in a predetermined depth so that the magnetic circuit is formed mainly across the inner circumference of yoke 13 and the outer circumferences 18e of plunger 18.

Figure 4:
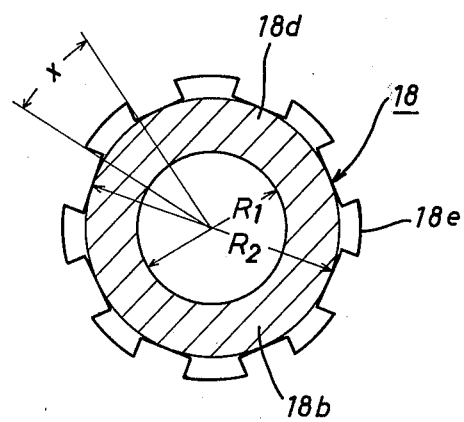
FIG. 4 is a cross sectional view of the plunger shown in FIG. 1 taken through the small diameter portion thereof.

As seen in FIGS. 3 and 4, the circumference area of each of the large diameter portions 18a, 18c is substantially equal to the cross-sectional area of the small diameter portion 18b. The circumference area of each large diameter portion 18a, 18c and the cross-sectional area of the small diameter portion 18b are represented by the following relative relationship:

$$\pi R_M \cdot L \cdot \frac{X}{2\pi} N = \frac{\pi}{4} (R_2^2 - R_1^2),$$

where $R_M$ is the large diameter of plunger 18, $R_1$ is the inner diameter of the plunger 18, $R_2$ is the small diameter of plunger 18 and N is the number of projections 18e.

When the solenoid coil 16 is deenergized, the plunger 18 is in its original position to close the axial holes 17b of support shaft 17, as shown by solid lines in FIG. 1. When a direct current from an electric power source is applied to the valve unit 10 to energize the solenoid coil 16, magnetic flux passes across the casing 11, the annular flange 13a of yoke 13, the outer circumferences 18e of large diameter portion 18a, the small diameter portion 18b and the outer circumferences 18e of large diameter portion 18c of plunger 18, and the stepped tubular member 13c of yoke 13. Then, a linear attraction force generated in proportion to the direct current between the inner circumference of the annular flange 13a and the outer circumferences 18e of the large diameter portion 18a of plunger 18 and between the inner circumference of the tubular member 13c and the outer circumferences 18e of the large diameter portion 18c of plunger 18. Thus, the plunger 18 is displaced by the linear attraction force against the biasing force of coil spring 19 to open the axial holes 17b of support member 17. This results in permitting fluid flow from the inlet port 12a to the outlet port 12b through the axial holes 17b.

The linear attraction force successively increases in proportion to further increase of the direct current so that the plunger 18 is further displaced against the biasing force of spring 19. When the plunger 18 is displaced to its maximum stroke end, as shown by an imaginary line in the figure, the axial holes 17b of support shaft 17 are fully opened to permit the maximum fluid flow supplied to the pneumatically operated device from the pneumatic pressure source. In this instance, the plunger 18 may not be conditioned in its magnetic saturation because the outer circumferences 18e of each of the large diameter portions 18a and 18c are substantially equal to the minimum cross-sectional area of magnetic path of the magnetic circuit as previously described. During the operation, the linear attraction force acts to displace the plunger 18 at the two portions between the yoke 13 and the plunger 18 through the annular clearance g. This serves to generate a sufficient attraction force for smoothly controlling the displacement of plunger 18 in spite of reduction of the outer circumference area of plunger 18 facing the inner circumference of yoke 13 through the annular clearance g.

With the construction described above, the arrangement of the sleeve-like plunger 18 relative to the axial holes 17b of support shaft 17 serves to reduce the axial length of an electromagnetically operated valve unit of this kind in a simple construction. In practice of the present invention, the plunger 18 may be modified in such a manner that the outer circumferences 18e of each of the large diameter portions 18a and 18c are less than the minimum cross-sectional area of magnetic path. In this case, the magnetic characteristic of yoke 13 may be different from that of the plunger 18 to appropriately adjust the maximum stroke of plunger 18. Alternatively, the axial grooves 18d of plunger 18 may be spiraled, and the respective large diameter portions 18a, 18c of plunger 18 may be formed at one portion of plunger 18.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In an electromagnetically operated valve unit for controlling the quantity of fluid flow in proportion to an electric current applied thereto, said valve unit comprising:

a casing of magnetic material having inlet and outlet ports;

a support shaft of non-magnetic material fixed in position within said casing and having an axial bore in open communication with one of said inlet and outlet ports and an axial hole formed in the peripheral wall of said axial bore to provide fluid communication between said inlet and outlet ports;

a plunger of magnetic material in the form of a sleeve member axially movable on said support shaft and cooperating with the axial hole of said support shaft to open and close the fluid communication;

resilient means for biasing said plunger in one direction to normally close the axial hole of said support shaft;

a tubular yoke assembly including a pair of tubular members of magnetic material and an annular member of non-magnetic material concentrically arranged with said support shaft and facing at their inner circumferences the outer circumference of said plunger with a predetermined annular clearance; and a solenoid coil wound around said tubular yoke assembly to be energized by the electric current;

the improvement wherein said plunger includes a pair of large diameter portions and a small diameter portion between the large diameter portions, the axial length of each of the large diameter portions being substantially equal to the axial length of each of said tubular yoke members, and wherein the large diameter portions of said plunger face the inner circumference of said yoke assembly with said predetermined annular clearance and are formed respectively at their outer circumferences with a plurality of grooves in such a manner that the outer circumference area of each of the large diameter portions is substantially equal to the cross-sectional area of the small diameter portion.

2. An electromagnetically operated valve unit as claimed in claim 1, wherein said plurality of grooves on each of the large diameter portions of said plunger are in the form of a plurality of equidistantly spaced axial grooves.

* * * * *